(12) United States Patent
Yan et al.

(10) Patent No.: US 9,601,997 B2
(45) Date of Patent: Mar. 21, 2017

(54) V2 POWER CONVERTER CONTROL WITH CAPACITOR CURRENT RAMP COMPENSATION

(71) Applicant: Virginia Tech Intellectual Properties, Inc., Blacksburg, VA (US)

(72) Inventors: Yingyi Yan, Blacksburg, VA (US); Pei-Hsin Liu, Blacksburg, VA (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 29 days.

(21) Appl. No.: 14/183,841

(22) Filed: Feb. 19, 2014

(65) Prior Publication Data

US 2014/0292300 A1 Oct. 2, 2014

Related U.S. Application Data

(60) Provisional application No. 61/806,457, filed on Mar. 29, 2013.

(51) Int. Cl.
*H02M 3/157* (2006.01)
*H02M 3/156* (2006.01)

(52) U.S. Cl.
CPC ......... *H02M 3/156* (2013.01); *H02M 3/157* (2013.01); *H02M 2003/1566* (2013.01)

(58) Field of Classification Search
CPC .. H02M 3/156; H02M 3/1563; H02M 3/1582; H02M 2001/0003; H02M 2001/0025; H02M 1/14
See application file for complete search history.

(56) References Cited

U.S. PATENT DOCUMENTS

| 2006/0023479 | A1* | 2/2006 | Leung et al. ................... 363/97 |
| 2007/0210777 | A1* | 9/2007 | Cervera et al. ............... 323/284 |
| 2014/0266120 | A1* | 9/2014 | Isham .................. H02M 3/158 323/283 |

* cited by examiner

*Primary Examiner* — Jeffrey Gblende
(74) *Attorney, Agent, or Firm* — Whitham, Curtis & Cook, P.C.

(57) ABSTRACT

Operation of a switching power converter having an output capacitor having a small equivalent series resistance (ESR) is stabilized and jitter reduced by sensing capacitor current with gain and combining the resulting signal with the output voltage signal to provide a feedback signal to control switching of the power converter. capacitor current can be sensed without interfering with operation of the filter capacitor by providing a branch circuit having a time constant matched to the output or filter capacitor but an arbitrarily high impedance so as to be effectively lossless. The gain provided in the capacitor current signal can be tuned to provide optimally short settling time after load transients; generally within one switching cycle. Matching of time constants and/or tuning of gain can be performed automatically.

16 Claims, 18 Drawing Sheets

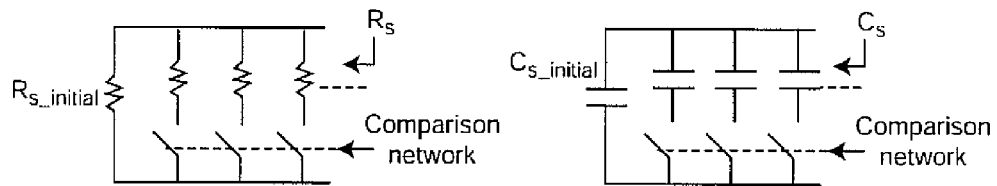
Figure 17                    Figure 18
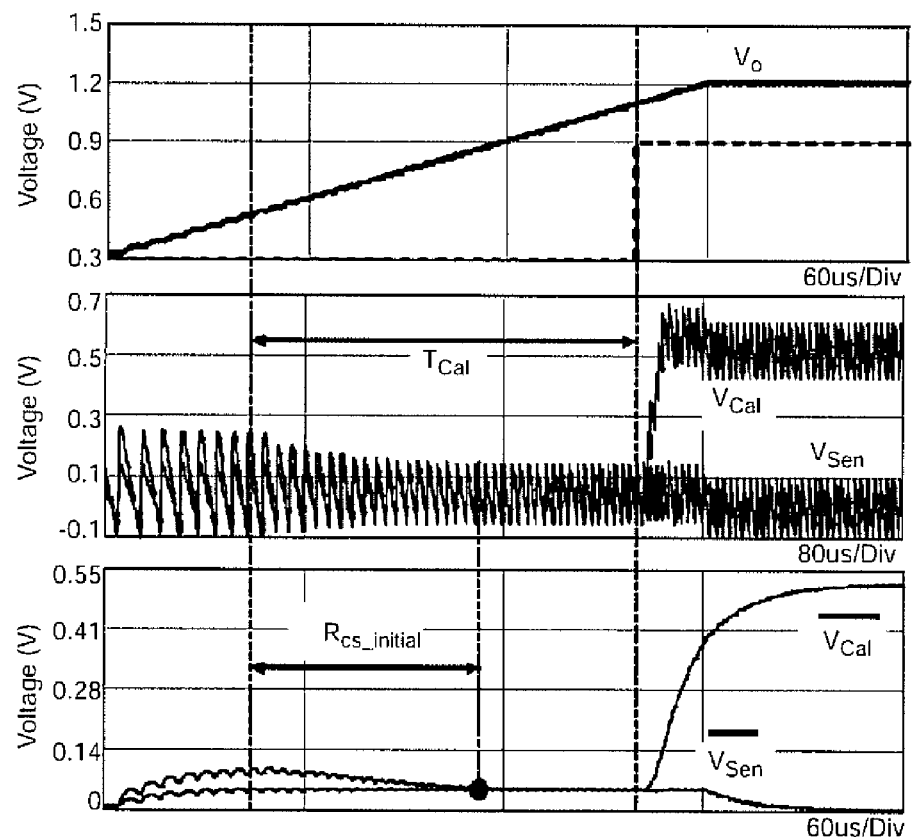
Figure 19

V2 POWER CONVERTER CONTROL WITH CAPACITOR CURRENT RAMP COMPENSATION

CROSS-REFERENCE TO RELATED APPLICATIONS

This application claims benefit of priority of U.S. Provisional Application 61/806,457, filed Mar. 29, 2013, which is hereby incorporated by reference in its entirety.

FIELD OF THE INVENTION

The present invention generally relates to power converters and regulators and, more specifically, to voltage control of power converters and regulators using capacitor current sensing that is substantially lossless and capable of self-calibration and auto-tuning.

BACKGROUND OF THE INVENTION

Use of output voltage feedback arrangements has become popular for control of power converters and voltage regulators, particularly for point of load (POL) power supplies and voltage regulators for microprocessors where supplied voltage must be constrained within close tolerance even though load current may vary widely and rapidly. Some integrated circuits require not only regulation of voltage within close tolerances but also specify a reduction of voltage with increasing current, referred to as voltage droop, in order to better manage heat dissipation caused by extreme integration density and high clock rates. In any case, voltage feedback in a switching voltage regulator or power converter is usually performed by feeding the output voltage converter back to a comparator that compares the output voltage to a reference voltage and produces a pulse width modulated (PWM) control signal for the switches of the switching regulator or converter. This type of control can be enhanced by providing an additional integrating feedback loop such that the output voltage is a function of both the average and instantaneous output voltage and which is referred to as $V^2$ control.

It has been shown that output voltage feedback for voltage regulation is essentially a current mode control with load current feedback and that the load current feedback and the inductor current feedback share the same load sensing gain, $R_{co}$, since the capacitor current is the difference between the inductor current and the load current. While the output or load current can be sensed in numerous ways, using the equivalent series resistance (ESR) of the output capacitor achieves fast line and load transient response in a simple manner since the ESR of the output capacitor is the same as the current sensing gain.

However, types of capacitors that have sufficient ESR for current sensing such as so-called OSCON™ or POSCAP™ capacitors are of large size and relatively short usable lifetimes. For these reasons, so-called ceramic capacitors (which generally but not necessarily include a component of ceramic material) are generally preferred in commercial power management products for their characteristically small size and long lifetime although use of ceramic capacitors as the output capacitor of a $V^2$ controlled converter causes instability (referred to as sub-harmonic instability) at practical switching frequencies within several MHz. The small signal model is provided in "Modeling of $V^2$ Current-Mode Control" by Jian Li et al., Circuits and systems I: Regular Papers, IEEE Transactions on, Vol. 57, No. 9, pp. 2552-2563, September, 2010. Additionally, even when the switching frequency is greater than several MHz, and the system is theoretically stable, jittering (because the ripple magnitude is small and decreases with increasing switching frequency compared with inevitable noise) is unacceptable. Several approaches to stabilizing or compensating voltage feedback control, and $V^2$ control, in particular, using ceramic capacitors have been proposed but each has presented additional problems that limit the application for which the power converter may or may not be appropriate.

SUMMARY OF THE INVENTION

It is therefore an object of the present invention to provide a power converter and method of use of a low ESR capacitor for inductor or load current sensing that does not cause instability at practical converter/regulator switching frequencies.

It is another object of the invention to provide a "lossless" capacitor current measurement branch network for measuring current in an output or filter capacitor.

It is a further object of the invention to provide an arrangement for calibrating a "lossless" capacitor measurement network to have a time constant substantially equal to a time constant of an output or filter capacitor.

It is a yet further object of the invention to provide for automatic tuning of gain of a capacitor current sensor to provide optimal load step transient response that settles to steady-state within one or two switching cycles of the power converter.

In order to accomplish these and other objects of the invention, a power converter comprising a ceramic output or filter capacitor, a control circuit including a direct output voltage feedback path, a current sensor for measuring current in the output or filter capacitor to produce a voltage signal proportional to current in the output or filter capacitor, and an arrangement for combining the signal proportional to current in the output or filter capacitor with a signal in the direct output voltage feedback path.

In accordance with another aspect of the invention, a method of controlling a power converter having a switch driver and an output or filter capacitor having a equivalent series resistance similar to that of a ceramic capacitor is provided comprising steps of sensing current in the output or filter capacitor to derive a capacitor current signal, combining the capacitor current signal with an output voltage signal of the power converter to form a combined signal, and controlling the switch driver of the power converter with the combined signal.

BRIEF DESCRIPTION OF THE DRAWINGS

The foregoing and other objects, aspects and advantages will be better understood from the following detailed description of a preferred embodiment of the invention with reference to the drawings, in which:

FIGS. 17 and 18 illustrate switched resistor and capacitor banks, respectively, for calibration, FIG. 19 is a graph of simulated calibration waveforms, FIGS. 20 and 21 graphically illustrate simulated $V_o/V_c$ and $Z_{oc}$ with calibration in accordance with the invention, respectively, FIG. 22 graphically illustrates a worst case load transient with and without calibration in accordance with the invention.

DETAILED DESCRIPTION OF A PREFERRED EMBODIMENT OF THE INVENTION

Figure 1:
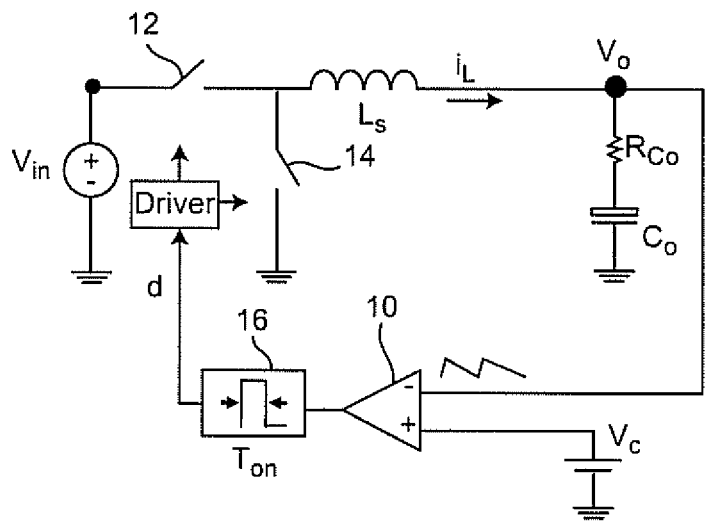
FIG. 1 is a schematic diagram of a power converter of buck topology and output voltage feedback.
Figure 2:
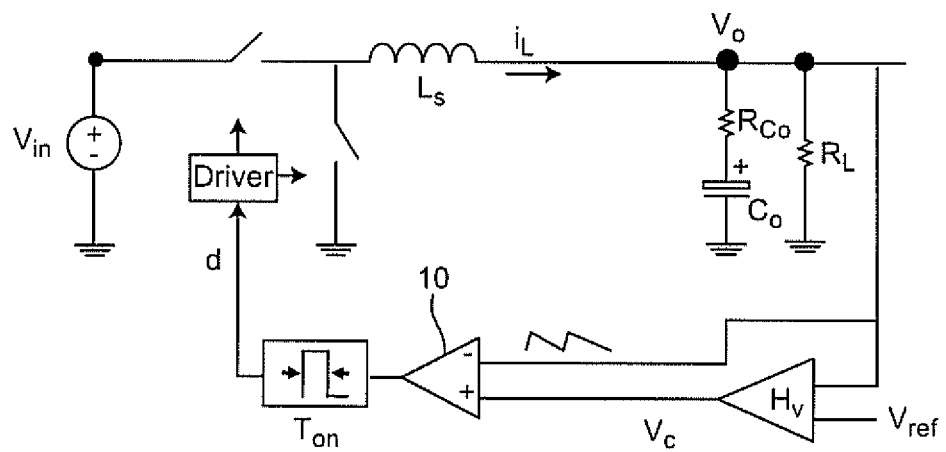
FIG. 2 is a schematic diagram of a buck converter similar to FIG. 1 but having an additional integrating feedback loop for $V^2$ control.

Referring now to the drawings, and more particularly to FIGS. 1 and 2, there is shown a buck converter having simple voltage feedback and voltage comparison control and a buck converter having $V^2$ control, respectively. It is to be understood that these schematic diagrams are generalized and arranged to facilitate an understanding of the invention as will be discussed below through a comparison therewith. Therefore, no portion of either FIG. 1 or FIG. 2 is admitted to be prior art in regard to the present invention and these Figures have been labeled "Related Art". It should also be understood that a buck converter is illustrated due to its simplicity and widespread choice for commercial products but that the invention as will be discussed in detail below is not limited to buck converters but can be applied to and practiced with a power converter or voltage regulator of any known or foreseeable topology.

It will be noted that the voltage in the feedback loop of FIG. 1 is a generally triangular waveform at the switching frequency and that the positive-going and negative-going portions of the waveform may have different slopes which will vary with the input voltage, output voltage, inductor and capacitor parameters and load current. This voltage ripple is caused by the connection and disconnection of the inductor from the power supply and corresponding increase and decrease of inductor current. While the amplitude of this ripple voltage is generally small, it can become relatively large during transient changes in load current when currents charging and discharging of the output filter capacitor become large. It should be appreciated in this regard that since the output voltage containing the ripple voltage is compared with a reference voltage at comparator 10 and used to determine the complementary turn-on and turn-off times of switches 12 and 14, the ripple voltage will also cause advancing and retarding of the phase of the pulse width modulated (PWM) control signal as indicated by arrows in the pulse waveform illustrated at 16 of FIG. 1. This variation in timing of the leading and/or trailing edges of the control pulses is the principal source of instability or jitter alluded to above. Nevertheless, simple voltage feedback can provide fast load transient response and voltage regulation which is acceptable for many applications.

To improve regulation accuracy, an additional voltage feedback loop, sometimes referred to as an outer loop, that provides integration, Hv, can be added to the arrangement of FIG. 1 as shown in FIG. 2. Integration of the ripple voltage provides averaging and integrating and thus a more accurate and stable comparison with a reference voltage. However, instability and jitter are still observed if ceramic capacitors are used for the output filter capacitor $C_o$ due to the characteristically small ESR of ceramic capacitors.

It should also be noted in this regard that, in full $V^2$ control, the error between $V_{ref}$ and $V_o$ is integrated at Hv and provides the output control voltage $V_c$. In this configuration, the average $V_c$ value exactly follows $V_{ref}$ and $v_c$ is lower than $V_{ref}$ by one-half the ripple amplitude. Since one-half of the ripple voltage amplitude is generally a very small voltage, the integration, Hv, can be omitted and $V_{ref}$ can be used as $V_c$ in some applications (e.g. as shown in FIG. 1) where close voltage regulation is not critical. In such a case, the average output voltage value is higher than $V_{ref}$ by one-half the ripple amplitude.

Figure 3:
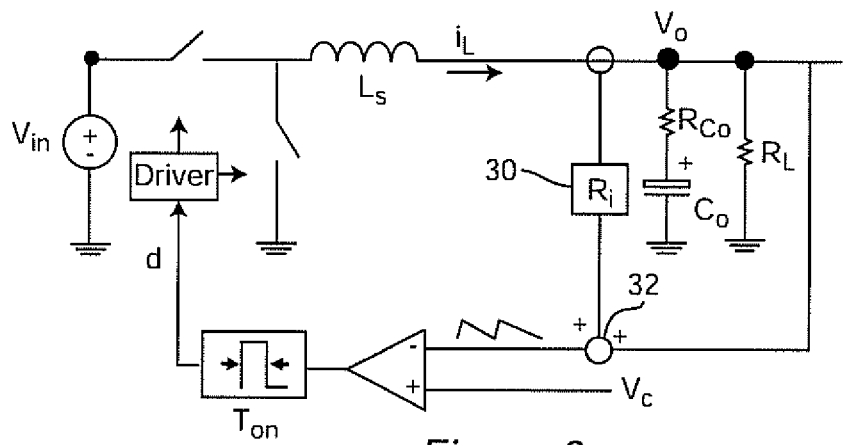
FIG. 3 is a schematic diagram of a buck converter with an internal inductor current ramp feedback.
Figure 4:
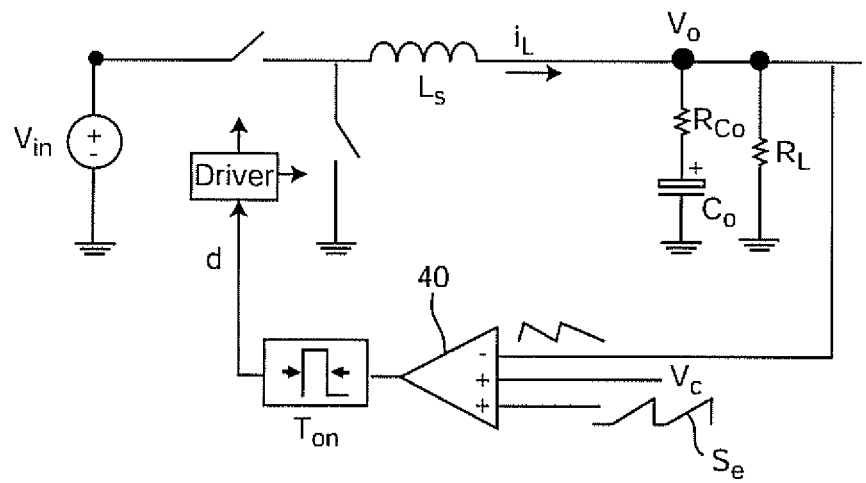
FIG. 4 is a schematic diagram of a buck converter using an external ramp feedback signal.

Referring now to FIGS. 3 and 4, two known techniques of stabilizing circuits such as those discussed above in connection with FIGS. 1 and 2 will now be discussed. As with FIGS. 1 and 2, these schematic diagrams are generalized and arranged to facilitate an understanding of the invention and no portion of FIG. 3 or FIG. 4, labeled as "Related Art", is admitted to be prior art in regard to the present invention.

The stabilization method of FIG. 3 uses the inductor current ramp to compensate the direct feedback loop. That is, the inductor current is sensed and added, with transfer function 30, Ri, at adder 32 to the feedback voltage from the output. The summed voltage is then compared with a control or reference voltage Vc to trigger the PWM signal. It can be analytically shown that, using inductor current ramp compensation, a proper slope of the inductor current ramp can always be found to stabilize the feedback loop with proper damping. However, the inductor current feedback changes the output impedance characteristic of the power converter and the output impedance at DC is not zero (or substantially zero) but a resistive impedance Ri. In the time domain, this resistive output impedance causes droop of the output voltage with increasing load current. In voltage regulators for microprocessors and similar devices where voltage droop (possibly zero) is specified, the current sensing gain Ri is thus dictated by the load line requirement of the device. That is, if the specified load line requirement is less than a certain value (e.g. 1 mΩ), the current ramp signal and transfer function gain Ri may not be sufficient to achieve good compensation.

Figure 5:
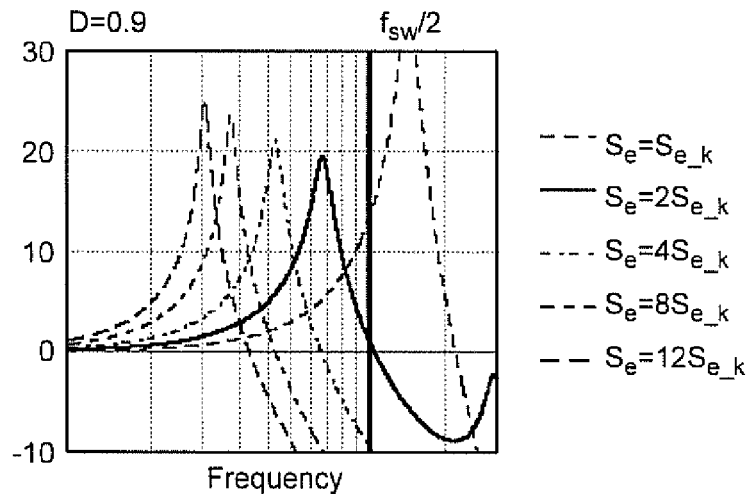
FIG. 5 is a graph of the small signal transfer function from control voltage to output voltage using $V^2$ control operating at a duty cycle, D=0.9, and compensated by an external ramp as illustrated in FIG. 4.

The second compensation method generally shown in FIG. 4 is to compensate the feedback loop with an external ramp signal having a slope $s_e$. The external ramp can be combined with the voltage feedback signal in numerous ways such as by addition as in FIG. 3 or applied directly to the comparator 40. This technique does not require the current sensing which complicates implementation as in FIG. 3 and eliminates voltage droop with increasing current. However, for the constant on-time $V^2$ control which is generally preferred, external ramp compensation cannot provide proper damping in the control loop at large duty cycles. FIG. 5 shows the control-to-$V_o$ transfer function of a $V^2$ controlled buck converter operating at a duty cycle, D, of 0.9. It is seen that for large duty cycles increasing the external ramp slope cannot adequately damp the double pole effect but pushes the double poles to a lower frequency.

Figure 6:
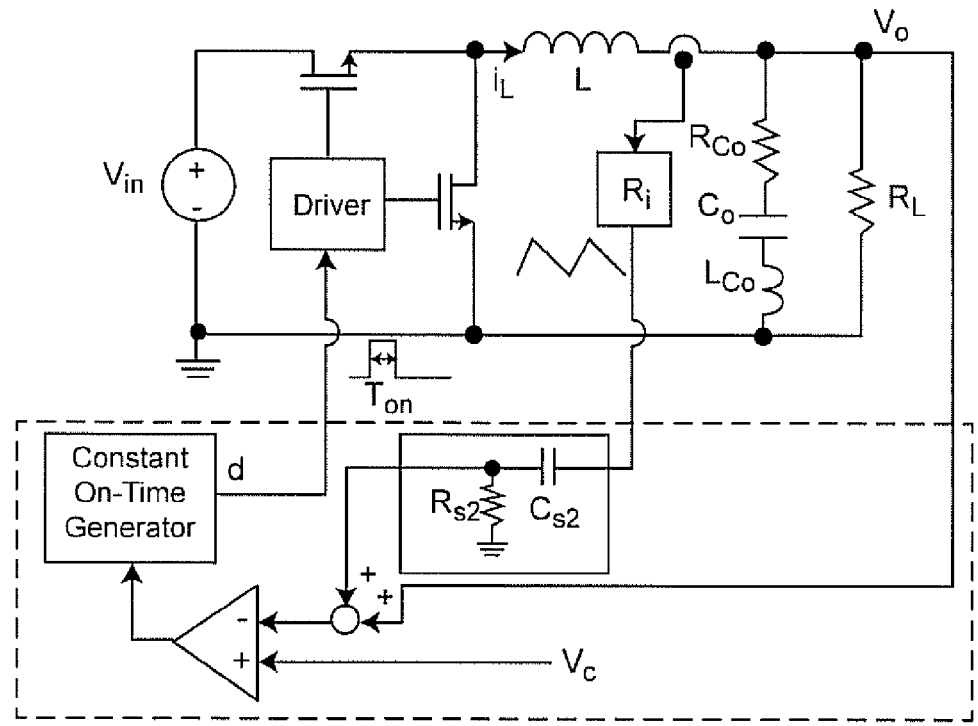
FIG. 6 is a schematic diagram of a buck converter compensated by an inductor current ramp with a high pass filter.

In addition to stability, the jittering problem which only exists in practical converter embodiments where the ripple signal is weak and noise causes the pulse width modulation to randomly shift and can be held to low levels by good design, is a limitation on use of $V^2$ control. Typically, the magnitude of output ripple is limited to the design specification for a given application, usually in the tens of mV. Thus, the pulse width is sensitive to the ripple and noise. Using a large external ramp to compensate for this sensitivity can reduce or eliminate jittering but compromises transient response. Inductor current injection as shown in FIG. 6 (basically combining the techniques of FIGS. 3 and 4) can reduce jittering but voltage regulation accuracy is adversely affected.

Figure 7:
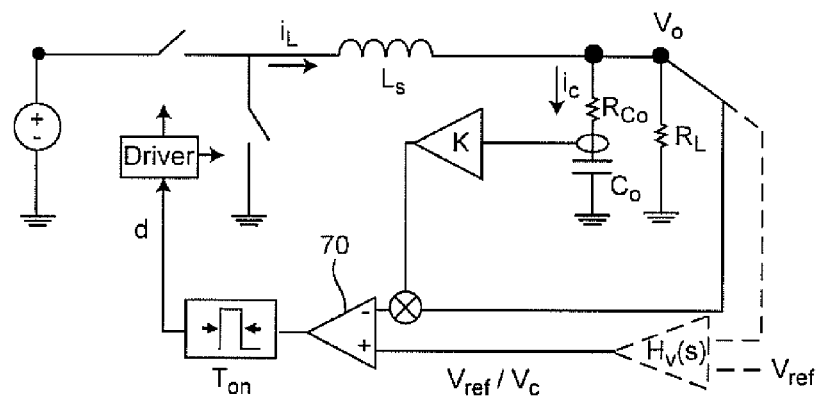
FIG. 7 is a schematic diagram illustrating the concept of $V^2$ control using a capacitor current ramp for stabilization/compensation in accordance with the invention.

Referring now to FIG. 7, the concept of capacitor current ramp compensation in accordance with the invention will now be discussed. Essentially, the capacitor current which corresponds to the derivative of the output capacitor voltage (with current-to-voltage gain K), is added to the output voltage and the summed signal is fed to comparator 70 to control PWM. This technique can be used with simple output voltage feedback (e.g. as in FIG. 1) or with an additional outer, integrating feedback loop as shown in dashed lines in FIG. 7 for improved regulation accuracy.

Capacitor current injection improves the $V^2$ control technique in several ways. With the enhanced capacitor current information, the total feedback ripple is dominated by the virtual ESR ripple which is electrically similar to the use of OSCON or POSCAP type capacitors as alluded to above, even though a ceramic capacitor is used, particularly since the signal representing the capacitor current can be amplified and thus is not limited by the voltage ripple specification. Moreover, since the capacitor current does not have a DC bias, no voltage droop occurs with increasing load current. This concept of capacitor current sensing may be implemented very simply with a small resistor in series with the capacitor avoiding the need for an inductive current sensor which may be expensive and possibly subject to noise. However, such a resistor would add small but possibly significant losses to the efficiency of the power converter system. Further, the parasitic inductance of the resistor connections and pins may increase a voltage spike under load step transient conditions.

Figure 8:
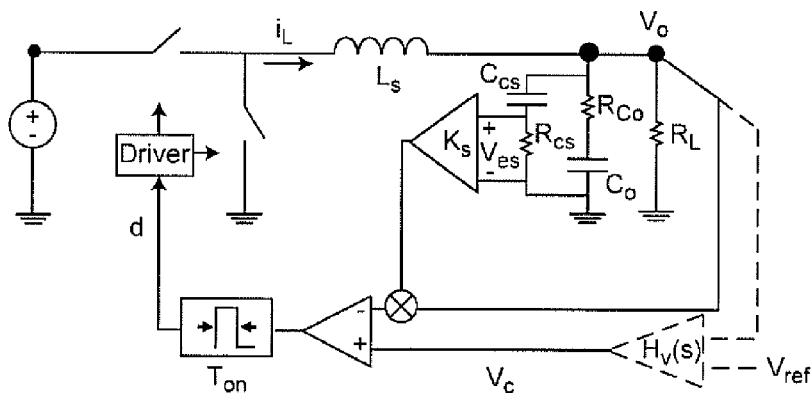
FIG. 8 is a schematic diagram illustrating an implementation of $V^2$ control using capacitor current sensing in accordance with the invention, FIGS. 9A and 9B graphically illustrate capacitor current waveforms under different conditions of time constant mismatch, FIG. 10 graphically illustrates high double pole peaking of the control-to-output transfer function at one-half the switching frequency at high duty cycle and current sensing branch time constant mismatch, FIGS. 11 and 12 graphically illustrate capacitance change with DC bias voltage and temperature, respectively.

For these reasons, it is preferred to implement the invention with a circuit that is referred to as a lossless capacitor current sensing circuit since it avoids the losses that would occur through use of a small resistor in series with the filter capacitor. However, some loss which can be easily reduced to any desired degree and levels which are certainly negligible will theoretically be inherent in the capacitor current sensing circuit. As shown in FIG. 8, the lossless capacitor current sensing circuit in its simplest and preferred form comprises a branch circuit connected in parallel with the output filter capacitor that includes a capacitor, $C_{cs}$, in series with a resistor, $R_{cs}$. If the conditions $$C_{cs}=C_o/N, R_{cs}=N \cdot R_{co} \quad (1)$$

are met, then the impedance of the branch circuit, $Z_{cs}$ is N times larger than the impedance, $Z_{co}$, of the output filter capacitor and can be made arbitrarily large to decrease current, $i_{cs}=i_{co}/N$, in $R_{cs}$ and thus resistive losses to any arbitrarily low level. In other words, if the time constant of the branch circuit is the same as the time constant of the output capacitor, the voltage across $R_{cs}$ will be the same as the voltage across the ESR of the output capacitor even though the ESR of a ceramic capacitor is very small. The current in the output capacitor is thus emulated by the voltage across the resistor in the capacitor current sensing branch circuit and can be amplified by a differential amplifier with a gain of $K_s$ (a voltage-to-voltage gain as distinct from current-to-voltage gain, K, indicated in FIG. 7 which is a current-to-voltage gain but both are gains for a signal corresponding to capacitor current).

In order to reduce current in the branch circuit to negligible levels, the capacitor in the branch circuit should be very small in value and the resistor in the branch circuit should be very large in value, for example, two orders of magnitude difference from the capacitance and ESR of the output capacitor have been found sufficient for practice of the invention and larger differences are easily achieved. Since the current is made very small, the physical size of the branch circuit is also very small.

There is, however, a design consideration for the capacitor current sensing branch circuit in that conditions which cause variation in capacitance value in ceramic capacitors are DC bias, temperature characteristics of the ceramic material and manufacturing tolerances. Therefore the sensing capacitor should be matched as closely as possible to the output capacitor in materials and manufacturing tolerances and located as closely as possible to the output capacitor. Using capacitors formed of the same material can effectively compensate for the variations caused by temperature and DC bias. If there is a mismatch between the time constants of the output capacitor and the branch circuit the damping of the double pole peaking at one-half the switching frequency with $V^2$ control and other types of current mode control using the lossless capacitor current sensing circuit in accordance with the invention will be adversely affected; adversely affecting transient response.

Figure 9A:
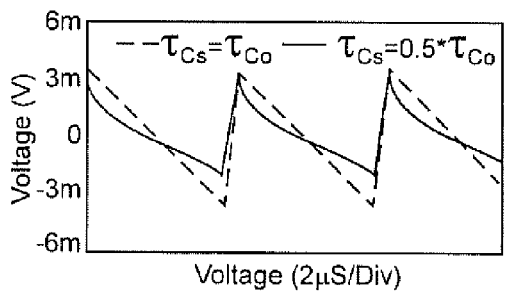
Figure 9B:
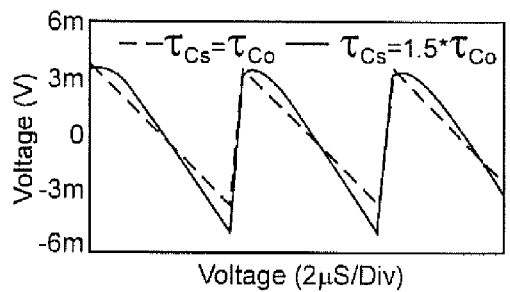
Figure 10:
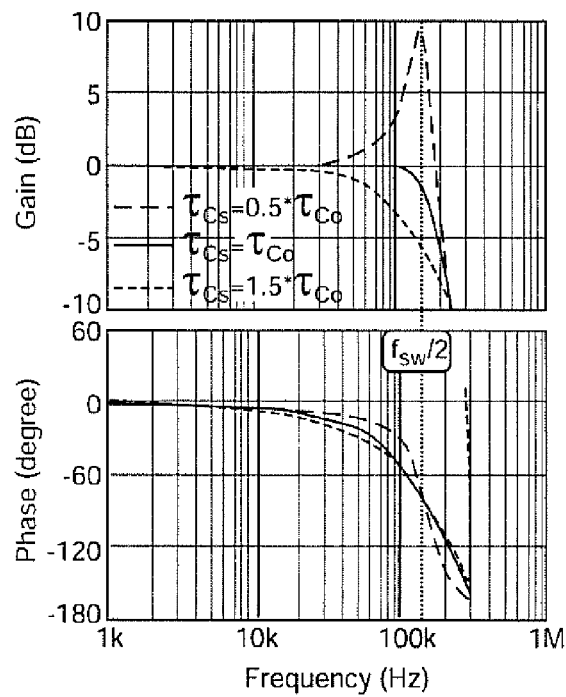

FIGS. 9A and 9B illustrate simulation waveforms of the capacitor current sensing circuit or network under different time constant mismatch conditions. It is seen that the current feedback waveforms become distorted in both reduced amplitude and slope, causing high double pole peaking of the control-to output voltage transfer function ($V_o/V_c$) at half the switching frequency as shown in FIG. 10. Therefore, an oscillatory response can occur in high duty cycle operation. Also, when $\tau_{cs}=1.5\tau_{co}$, the double pole is over damped and the transient response is slowed.

Figure 11:
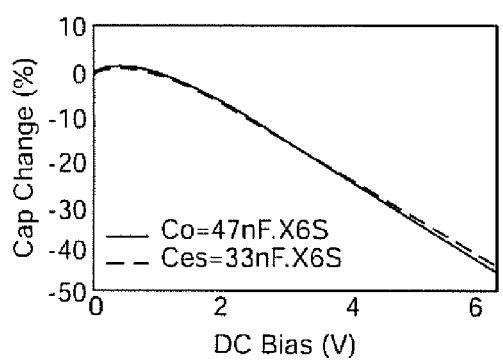
Figure 12:
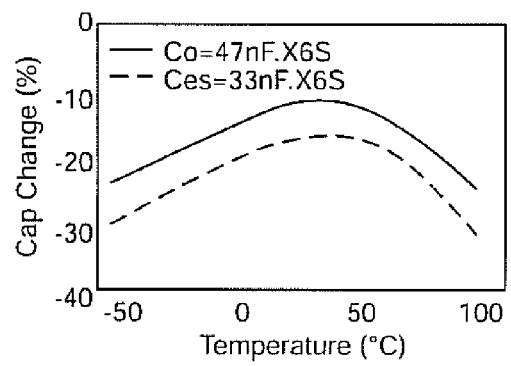

FIGS. 11 and 12 show exemplary curves (provided by the capacitor manufacturer) of change in capacitance with DC bias and temperature for well-matched capacitors, respectively, for capacitors having capacitance differing by more than three orders of magnitude. Therefore, so-called passive matching of capacitors is possible for the successful practice of the invention. However, passive matching cannot compensate for manufacturing tolerances and aging effects which may differ markedly between capacitors having widely differing capacitance values. Additionally, capacitors of the same ceramic materials may differ substantially in temperature and DC bias characteristics when obtained from different vendors. Thus, in mass production of power converters, close passive matching of capacitors may result in suitably matched capacitors being available from only a single source which may increase the bill of materials cost of the power converters manufactured.

Accordingly, it is preferred to provide self-calibration which can dynamically provide adequately close matching of time constants at output voltage scaling (such as start-up or dynamic reference voltage change) during operation of $V^2$ control of power converters including a capacitor current sensing network such as is described above. This self-calibration technique is also considered to be within the scope of the present invention.

The basic principle of self-calibration is that, at output voltage scaling, the inductor current during connection of the power converter to the power source is substantially equal to the capacitor charging current. (Load current is relatively much smaller with respect to capacitor charging current during output voltage scaling, before a "Power Good" signal is sent from the power converter to the load. For example, the slope of the output voltage scaling response of a power converter for a microprocessor load can be as high as 50 mV/μsec. while the slope of a digital signal processor load is approximately 10 mV/μsec. Thus the capacitor charging current is comparatively large.) The inductor current during output voltage scaling, $i_L \approx i_{co}$, can then be measured as a reference for time constant calibration while the capacitor current sensing network provides the current value in the capacitor current sensing branch. If the two time constants are perfectly matched the ratio of the capacitance values and, hence, capacitor charging current and current through the capacitor current sensing branch should be in a fixed ratio of N because the same slope of voltage ($dV_o/dt$) is across both $C_o$ and $C_s$. If a mismatch occurs, the ratio of currents will deviate from N and the difference between $i_{co}$ and $K_1 \cdot i_{cs}$ can be detected and compared by a comparison network to alter the time constant of the current sensing branch by adjusting the capacitance or resistance until the difference is brought within an acceptable near-zero tolerance. In addition to calibration, the inductor current sensing also serves the purpose of over-current protection since no over-current protection is provided when only the capacitor current is sensed. Therefore, in practice, sensing of inductor current is generally desirable and provided, as indicated in FIGS. 13-16 by the arrow/connection labeled "(For OCP)".

Figure 13:
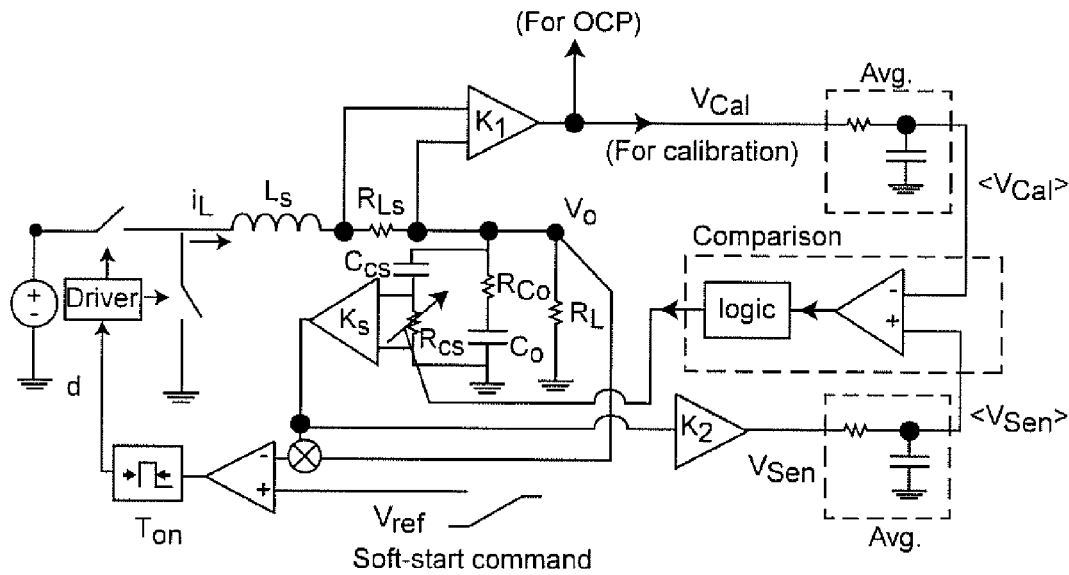
FIGS. 13, 14, 15 and 16 are schematic diagrams illustrating examples of implementations of calibration control in accordance with the invention.

More specifically and with reference to the exemplary circuit of FIG. 13, during output voltage scaling and over one switching period, the average value of $i_o$ and $i_{cs}$ are a constant value due to the same $dV_o/dt$ being applied to both $C_o$ and $C_s$ which directly reflect the current levels in each of these capacitors, respectively. Therefore, capacitor variation can be detected by sensing the respective currents and can be used to correct the time constant of the capacitor current sensing network. Inductor current is directly measured using a small precision resistor or a temperature compensated DC resistance (DCR) sensor and a scaling amplifier with a gain of $K_1$ to obtain the $i_{co}$ information as a calibration reference. The $i_{cs}$ feedback information is also preferably scaled by an amplifier having a gain of $K_2$. The control relation when the time constants are matched is then $$(R_{Ls} \cdot K_1) \cdot \bar{i}_{co} = (R_{cs} \cdot K_2) \cdot \bar{i}_{Cs}$$

(where the diacritical mark, "-", indicates average value) which, if not fulfilled, $R_{cs}$ and/or $C_{cs}$ should be adaptively changed such that $$(R_{Ls} K_1/K_2) C_o = R_{cs} C_{cs}$$

which is of a form that clearly shows that the control relation seeks to compensate variation of the respective time constants. Either the resistance or the capacitance can be used for calibration. In theory, both can be concurrently used although the complication would be unnecessary unless, for example, one (e.g. the capacitor) was used for coarse calibration and the other (e.g. the resistor) was used for fine calibration.

Figure 14:
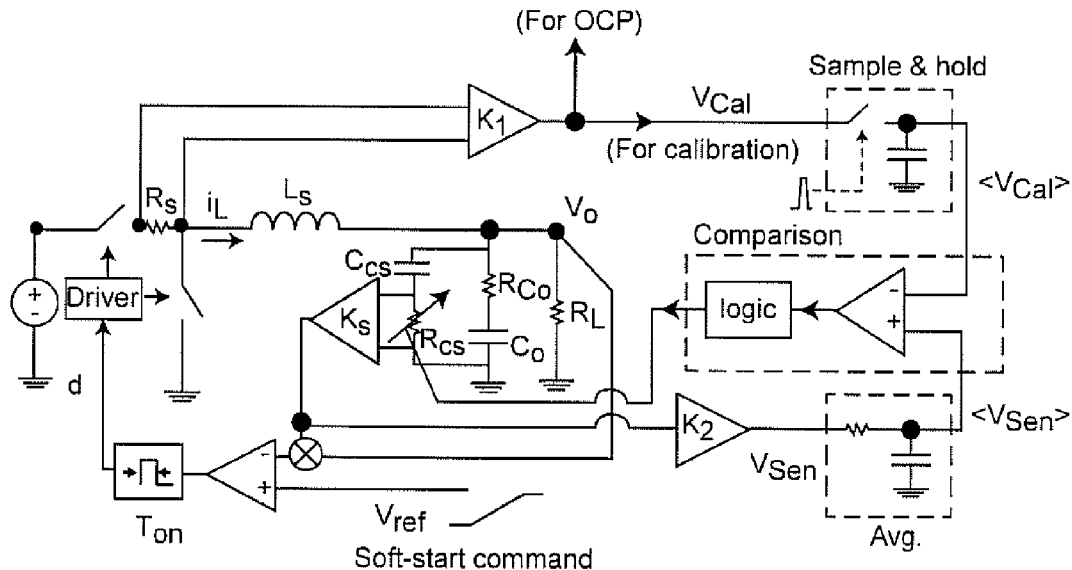
Figure 15:
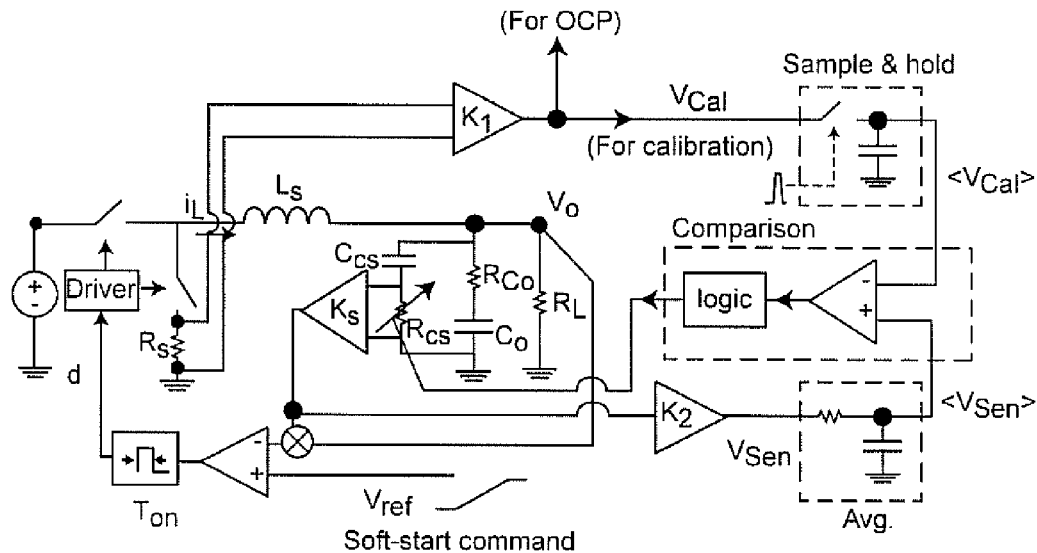
Figure 16:
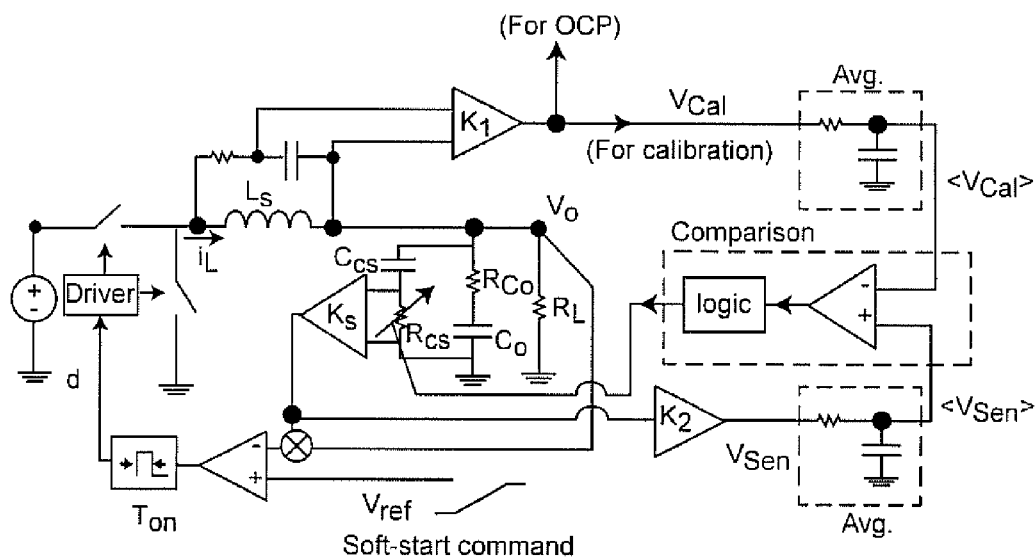

It should be noted from the exemplary implementation illustrated in FIG. 13 that averaging networks such as an integrator or RC lowpass filter, a sample-and-hold circuit or the like is used to obtain the average value of the two current signals and a comparison network detects a difference in current values to drive a logic circuit to control a calibrator. The design of these elements is not at all critical to the practice of the invention and numerous suitable circuits will be evident to those skilled in the art. A sample-and-hold circuit is slightly preferred since sampling may be synchronized to a very brief period at a desired location in the switching cycle. It should also be noted that inductor current can be sensed indirectly by sampling the top switch current as shown in FIG. 14 or sampling the so-called freewheel current as shown in FIG. 15. FIG. 16 is another example of an implementation using DCR current sensing to sense the inductor current. In this case, the RC circuit in parallel with the power stage inductor filters the voltage across the inductor. The voltage across the capacitor, $DCR*i_L$, provides measurement of the inductor current value.

As illustrated in FIGS. 17 and 18, calibration networks are preferably in the form of switched resistor or capacitor banks in which additional resistors or capacitors are connected in parallel to a respective resistor or capacitor of an initial value by individual switches. The individual resistors and capacitors may have increasing or decreasing values in a 1:2:5 or other approximately logarithmic ratio sequence to allow a total resistance or capacitance value to be obtained within a given tolerance relative to the time constant of the filter/output capacitor under average conditions. The value of the initial resistance should be designed in accordance with the largest anticipated time constant of the output capacitor since the addition of parallel resistors will reduce the total resistance and time constant. Conversely, the value of the initial capacitor should be designed in accordance with the shortest anticipated time constant of the output filter since addition of parallel connected capacitors will increase capacitance and time constant. The logic circuit controlling the switches should be designed to close one switch at a time and in a manner synchronized with the switching and current sensing comparison cycle so that the time constant is adjusted gradually until the current difference, as scaled, is brought within a given tolerance. It is also preferred that the logic circuit latch the switches when calibration is achieved so that the calibration circuit can be disabled and/or removed from the power converter circuit once calibration has been achieved.

Figure 20:
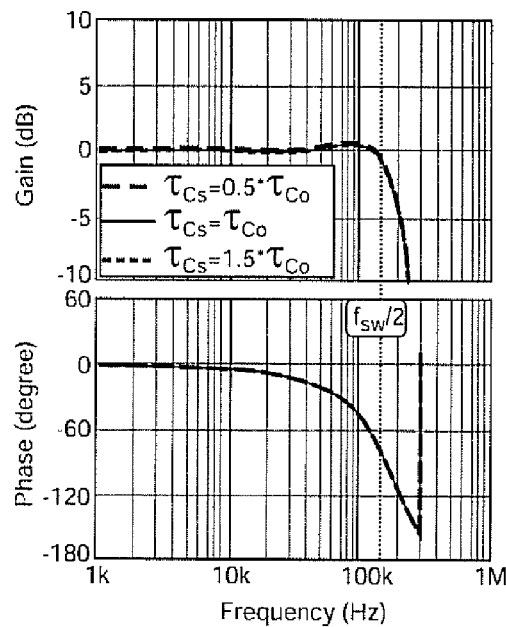
Figure 21:
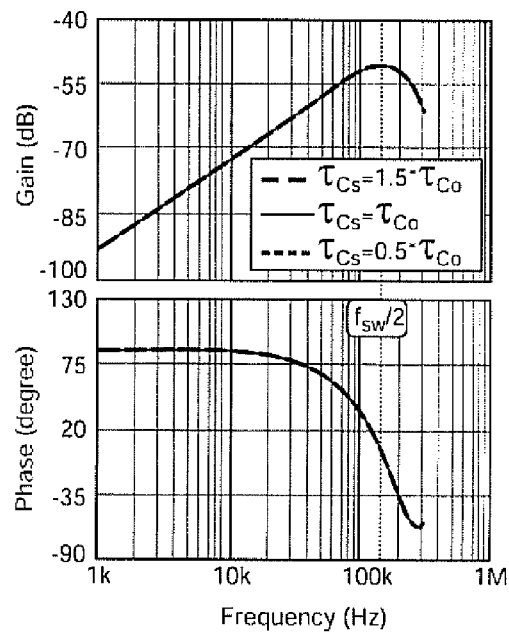
Figure 22:
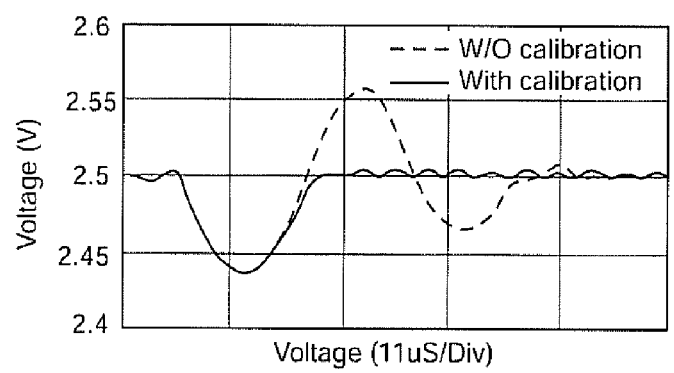

FIG. 19 shows simulated calibration waveforms during output voltage scaling. The calibration period, $T_{cal}$, is the period before "power good" (PG) changes state and connection is made to the load. The initial voltage, $V_{cal}$, is larger than $V_{sense}$ because $C_o$ is 30% smaller than its nominal value. When calibration starts $V_{cal}$ approaches $V_{sense}$ gradually since the equivalent $R_s$ is gradually reduced. FIGS. 20 and 21 show simulated $V_o/V_c$, output impedance, $Z_{oc}$, after the calibration in accordance with the invention as applied to a constant on-time $V^2$ controlled buck converter with the lossless capacitor current sensing network described above. Since the results are substantially the same for initial mismatches of time constants of ±50%, it is seen that the calibration methodology, block diagram and exemplary implementation are effective to automatically provide a sensing network time constant that is closely calibrated to the time constant of the output/filter capacitor. FIG. 22 illustrates a worst case load ($\tau_{cs}=0.5\tau_{co}$, D=0.5) transient comparison with and without the self-calibration in accordance with the invention as discussed above which also verifies the effectiveness of the self-calibration in accordance with the invention as discussed above.

As alluded to above, $V^2$ control can be considered as a current mode control with load current feedback and proportional capacitor current feedback. With the enhanced capacitor current information provided by the "lossless" capacitor current sensing branch as described above, the total feedback signal can be composed as $$V_{FB} = v_o + i_{co} \cdot R_{co} \cdot K_s$$
$$= i_L \cdot (R_{co} + K_s) - i_{load} \cdot R_{co}(1 + K_s) + v_{cap}$$

Figure 23:
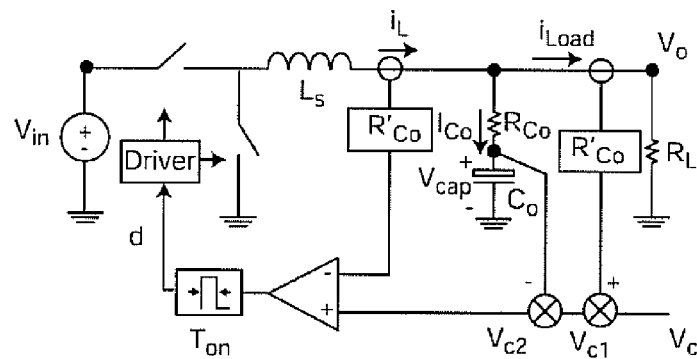
FIGS. 23 and 24 are schematic diagrams useful in understanding small signal modeling of the invention.
Figure 24:
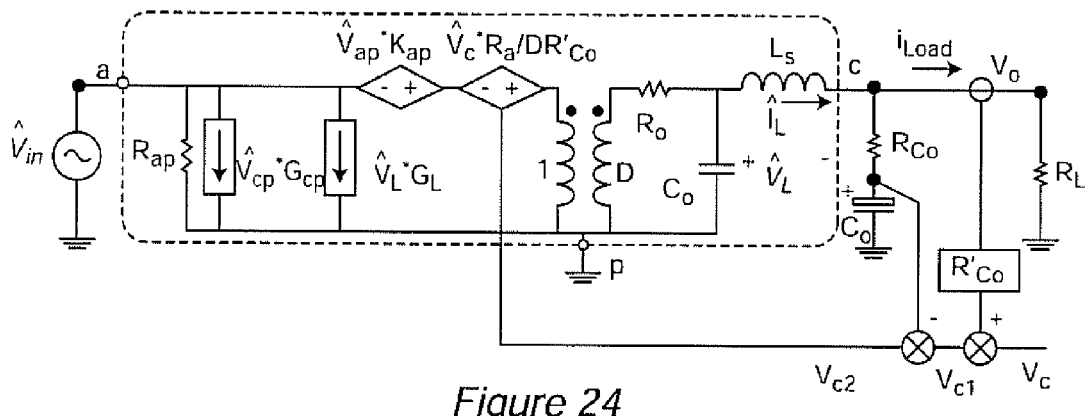

If $R'_{co}$ is then defined as $$R'_{co}=R_{co}(1+K_s),$$

the feedback loops can be regrouped as illustrated in FIG. 23. Then, assuming $$1/(2\pi R'_{co}C_{co}) \leq f_{sw}/2$$

is satisfied, by replacing the closed current loop by the three-terminal switch model, the small signal equivalent circuit of $V^2$ control with capacitor current ramp compensation can be represented as shown in FIG. 24 and all of the small signal transfer functions of interest can be derived by solving the equivalent circuit. If the above condition is not satisfied, a more complicated model is needed. In such a case, the control-to $v_o$ transfer function and output impedance are derived as $$v_o(s)/V_c(s) \approx 1/(1+(s/(Q_3\omega_2))+(s^2/\omega_2^2))$$

and $$Z_o(s)=As/(1+(s/(Q_3\omega_2))+(s^2/\omega_2^2))$$

where $$Q_3=T_{sw}/[(K_s+1)R_{co}C_o-0.5T_{on}]\pi, \ \omega_2=\pi/T_{sw},$$

and $$A=(T_{on}/2)[T_{on}/2C_o)-(K_s+1)R_{co}]-(1+D^2)/\omega_2^2C_o$$

In summary, the small signal model shows that there is a set of double poles at one-half the switching frequency. If the poles are complex poles, oscillation is caused. If the poles are real poles and far apart in frequency, the low frequency poles will dominate response speed and cause the response speed to be very slow. Thus, the optimum point for design is to place the poles where oscillation is avoided by only a very small margin.

The $V^2$ control thus has a very fast response to load step transients. However, in the first switching cycle after a load step transient, the switching period varies dramatically and cannot be fully estimated from the small signal model as will be discussed below and regulation of voltage may be compromised for a brief period. Therefore, it is necessary to tune the capacitor current sensing gain and a manual or automatic tuning methodology and circuit as will be discussed below are also considered to be within the scope of the invention.

Since a load step transient is usually not a small perturbation, the small signal model discussed above is not applicable during the perturbation. Further, load step transients of the same magnitude may cause perturbations of widely varying severity in terms of duration or time of returning to steady state response or magnitude of output voltage disturbance. Both the direction of the load step transient and the timing of the load step transient relative to the switching cycle can significantly affect the severity of effects of a load transient on power converter operation. For example, since buck converters generally are operated at a duty cycle, D<0.5, step down overshoot is usually larger than a step up transient. Therefore, to determine tuning of the capacitor load sensing gain, it is necessary to define the worst case of a load step down transient.

Figure 25:
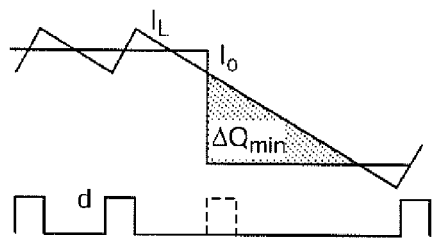
FIGS. 25 and 26 illustrate best and worst instants of load transients, respectively, FIG. 27 graphically illustrates load step-down transients with different capacitor current sensing gains.

The most optimistic case of a load step down transient occurs immediately before a switching pulse for connecting the power converter to a power source would ordinarily occur at heavy load. Since the transient occurs before the pulse can be triggered, the following pulse(s) that would occur at heavy load do not transfer excess power to the power converter, as shown in FIG. 25. Therefore, the excess charge that must be absorbed by the output/filter capacitor and represented by triangle $\Delta Q_{min}$ (between the output current, $i_o$, and load current, $I_L$, lines) in FIG. 25 is minimized.

Figure 26:
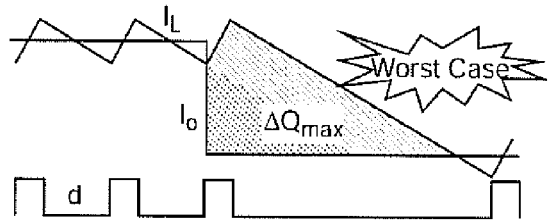

In sharp contrast therewith, the worst case load step transient occurs immediately after a switching pulse is triggered as shown in FIG. 26. In this case, a (generally fixed length in constant on-time control) current pulse principally extends after the step down transient and additional charge must be absorbed by the output/filter capacitor as indicated by the increased area of $\Delta Q_{max}$, generally causing output voltage overshoot which is determined by the switching period, inductor and capacitor value and cannot be mitigated by design of the control arrangement.

Figure 27:
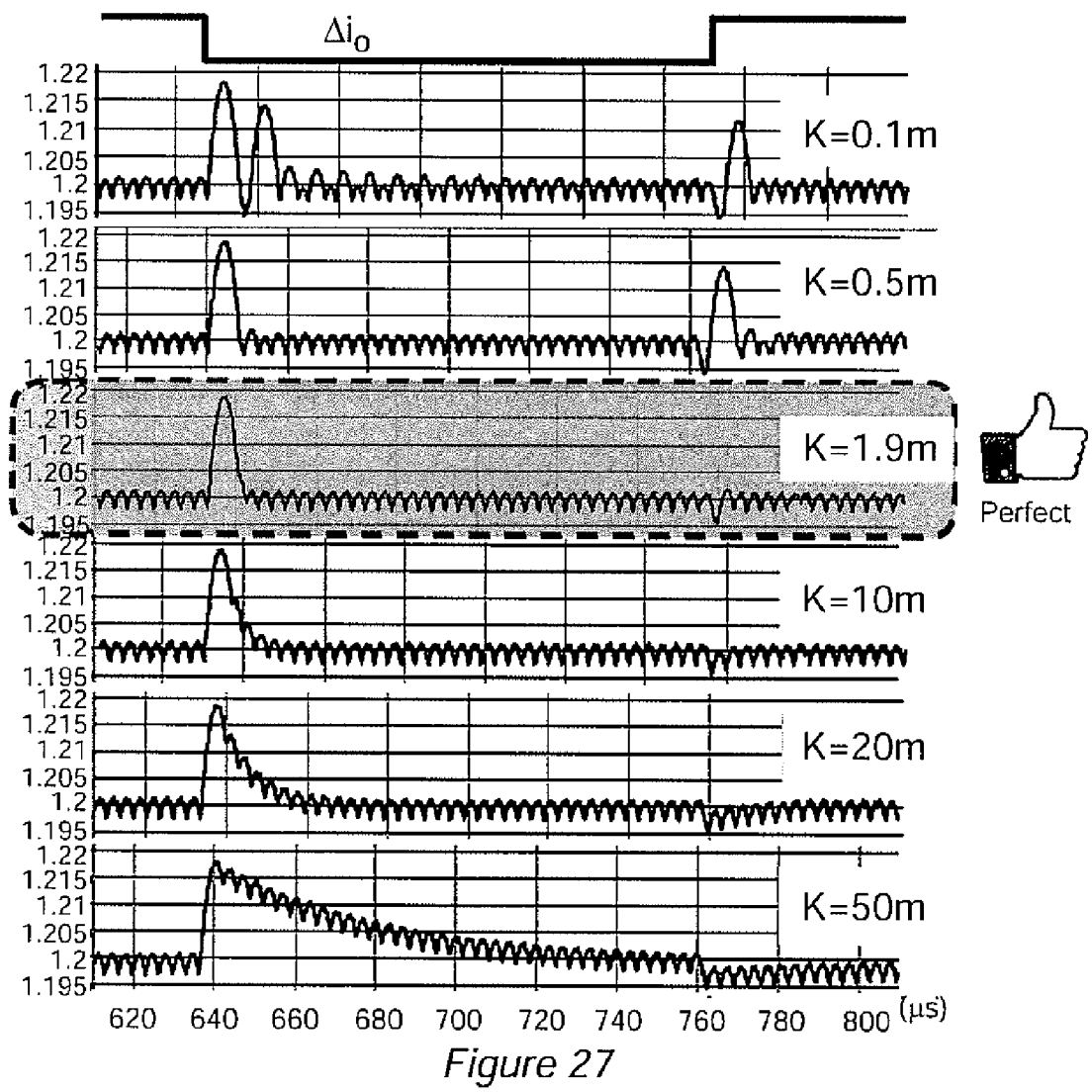

However, by tuning the current sensing gain, damping of the transient response can be optimized as will now be discussed in connection with FIG. 27 which shows load step down transient response with different capacitor current sensing gains, K. It is seen from FIG. 27 that the capacitor current sensing gain does not affect the magnitude of the overshoot at the step down transient which is the maximum deviation of the voltage regulation but the capacitor current sensing gain principally affects the settling pattern of the transient response. That is, with a small value of gain, K, the settling period is oscillatory which causes output voltage swing around the regulation voltage. As the gain, K, is increased, the oscillation receives more damping and if gain K is greater than an optimum value, the response is overdamped and the settling or decay time without oscillation is increased. The settling time is a first order response and becomes longer as K is increased above the optimum. At the optimum value of K, in this case K=1.9 mΩ, where the response is enclosed in a dashed line, the output voltage settles to the normal, steady-state ripple within one switching cycle. Note also that the load step-up transient response becomes almost vanishingly small at the optimum capacitor current sensing gain and exhibits a significant settling or decay time at larger values of K.

Figure 28:
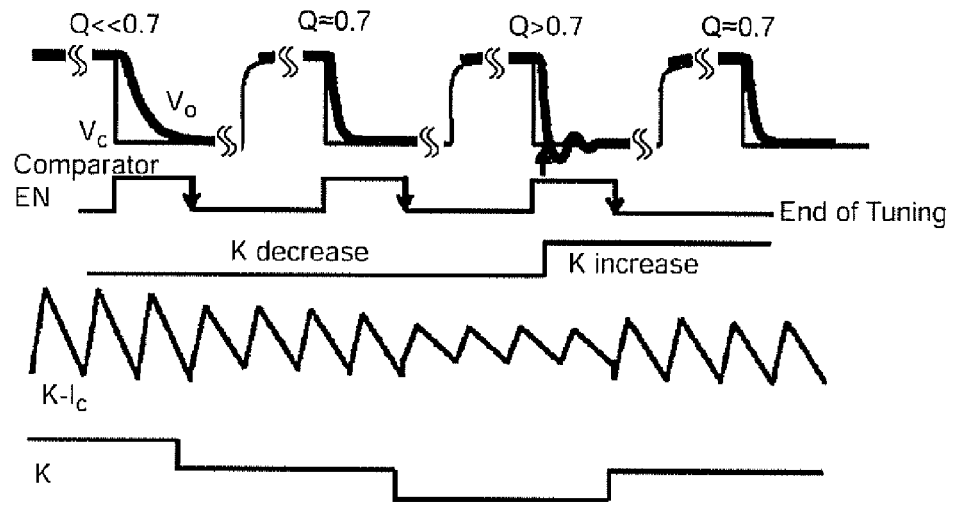
FIGS. 28 and 29 illustrate waveforms of an auto-tuning process in accordance with the invention.

The tuning process in accordance with the invention and which can be performed manually or automatically is illustrated in FIG. 28. Prior to the tuning process, K is set to a large value that is certain to be greater than the optimum value of K which guarantees that the system will be overdamped and that a decay time will be observable. A comparator is connected to a threshold voltage source and the output voltage and enabled for a period of time after a load step transient is applied. The threshold voltage is set to a voltage slightly lower than the regulation voltage of the output. The time during which the comparator is enabled should not be shorter than three switching cycles since oscillation, if present, occurs at one-half the switching frequency, as indicated by the small signal model as discussed above. If the output voltage remains higher than the threshold voltage, the comparator is not triggered. Therefore tuning may be accomplished by applying a reference transient (preferably by changing the regulation voltage with a step transient of the control voltage $V_c$ and, if the comparator is not triggered, reducing capacitor current sensing gain, K, by a small increment and repeating the process until the comparator is triggered by oscillation that will occur when the value of current sensing gain, K falls below the optimum value. When oscillation is detected, gain K is returned to the next higher value where oscillation was not detected as shown in FIG. 28. In terms of FIG. 27, the tuning process can be visualized as starting at a high value of K near the bottom of the Figure and iterating upwardly through the optimum K value, detecting the oscillation (encircled in FIG. 27) caused at a lower than optimum value of K, and returning to the optimum value of K (enclosed by dashed lines).

Figure 29:
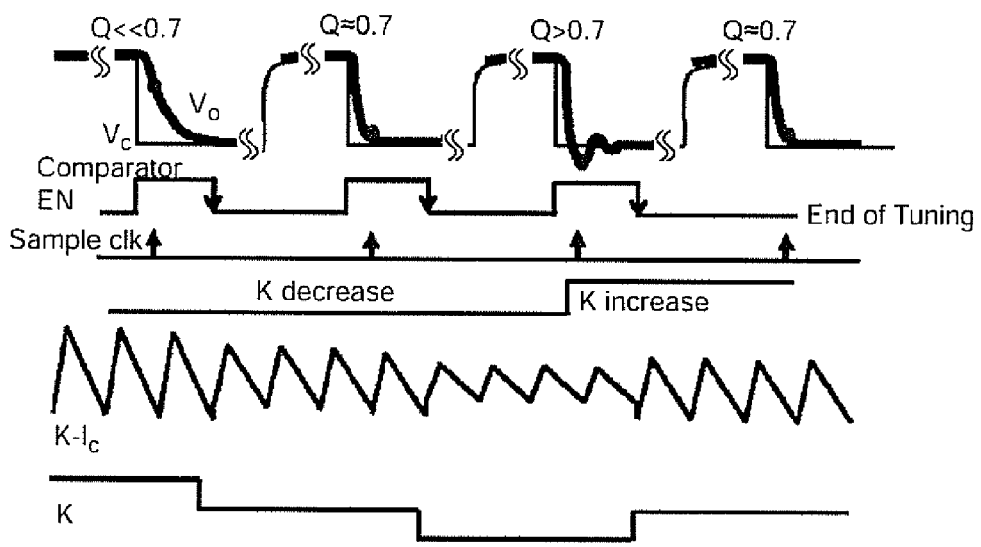

Another methodology for automatic or manual tuning of gain, K, is illustrated in FIG. 29. In this methodology, the output voltage is sampled at the rising edge of the first switching on-time after the $V_c$ step. The comparator is applied to the output voltage and the control voltage $V_c$ but the process is otherwise unchanged. If the sampled output voltage is above the control voltage, the system is overdamped and the process is repeated with the gain, K reduced by a predetermined step. As before, when the sampled output voltage is detected to be lower than the control voltage, that condition is necessarily caused by oscillation and the gain K can be returned to the last gain value where oscillation was not detected which, as before, will be optimal within the resolution of the predetermined step change in gain K.

Figure 30:
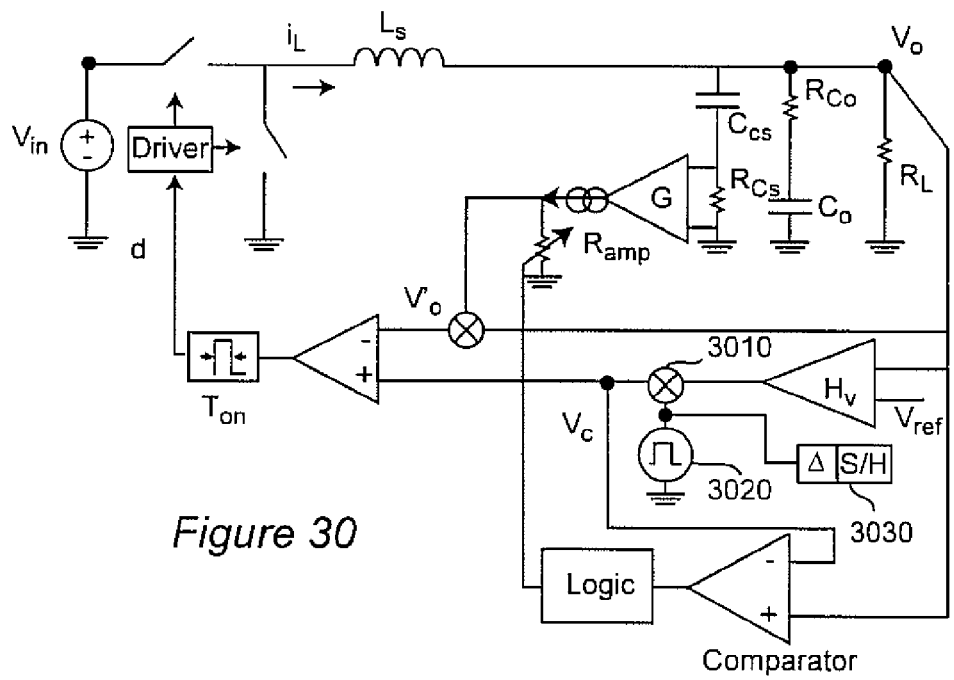
FIG. 30 is a schematic diagram of an example of auto-tuning circuitry.

Automatic performance of the capacitor current sensing gain can be accomplished, for example, using a further feedback loop as illustrated in FIG. 30. It may be helpful to compare FIG. 30 with FIG. 7 to identify the additional feedback circuit. The comparator connection shown in this example is connected for performing automatic gain tuning in accordance with the method of FIG. 29, discussed above. To perform the method in accordance with FIG. 28, the "-" input of the comparator would simply be connected to a threshold voltage reference. The load step transient is applied by multiplier 3010 and a step ($V_{step}$) signal generator 3020 which also controls sample-and-hold (S/H) circuit 3030 after a delay, Δ, as discussed above. Gain K may be altered in many ways that will be apparent to those skilled in the art such as by a current source output operational amplifier having a constant gain, G, that may be set at a high initial value as noted above. The signal produced by gain G can be attenuated by resistor $R_{amp}$ that may be constituted by, for example, logic circuitry and a resistor bank such as that discussed above in connection with FIG. 17.

Figure 31:
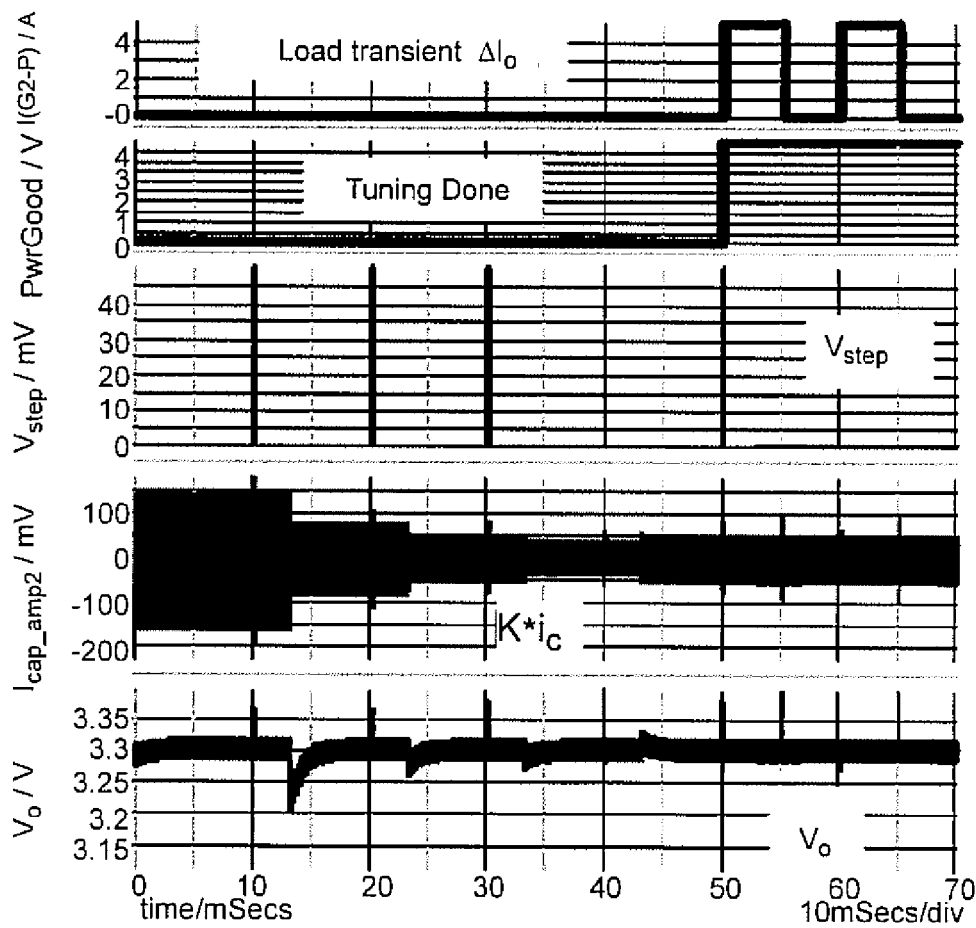
FIG. 31 is a graph of simulated results of an auto-tuning process.
Figure 32:
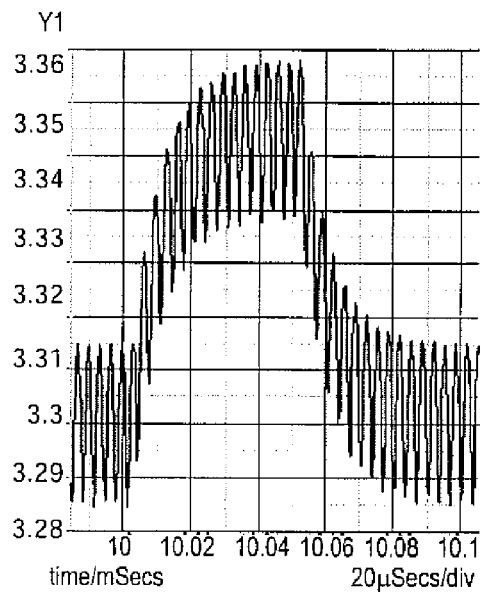
FIGS. 32 AND 33 show step responses of the invention before and after tuning.
Figure 33:
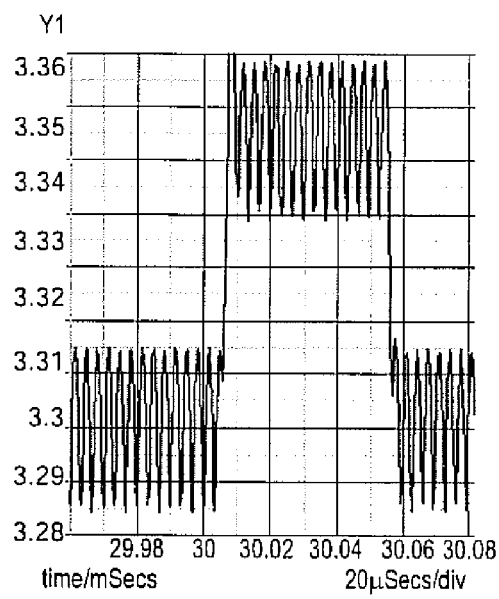
Figure 34:
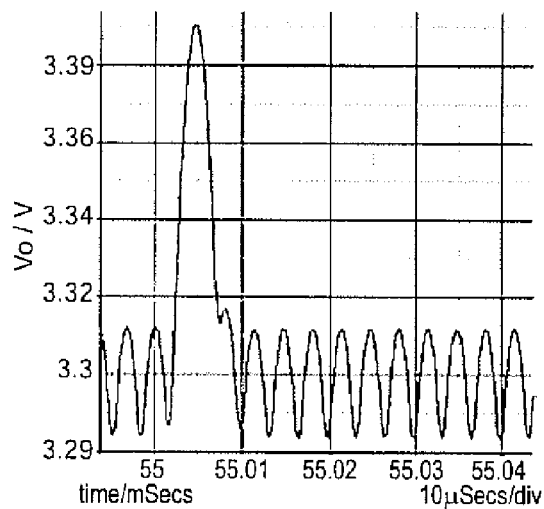
FIGS. 34 and 35 show load step-down and load step-up transient responses after auto-tuning of K.
Figure 35:
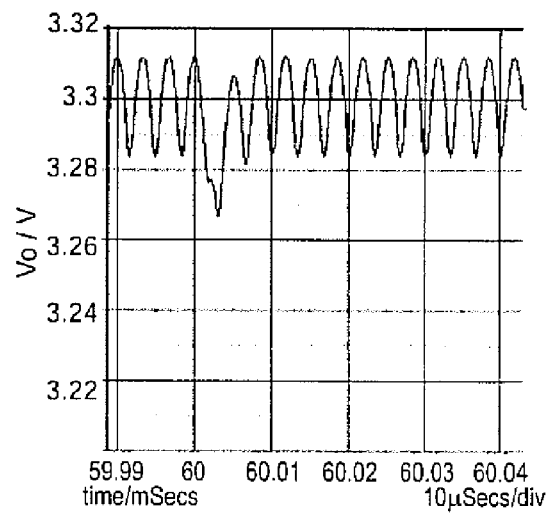

Simulated waveforms of the tuning process performed by the arrangement of FIG. 30 are illustrated in FIG. 31. It is clearly seen that the output voltage transients diminish rapidly and that tuning can produce optimal performance after only a very few step reductions in gain. The increase in gain after detection of oscillation is seen to be coincident with the termination of the tuning process. Following the tuning process load current step-up and step-down transients are also shown as occurring with the step-down transients producing an output voltage transient that settles in a single switching cycle. FIGS. 32 and 33 show the step responses before and after tuning, respectively, and the rapid settling of the output voltage transients is evident in those Figures and even more clearly in the more detailed FIGS. 34 and 35 showing the step-down and step-up transient responses which are optimal for a buck converter.

Figure 36:
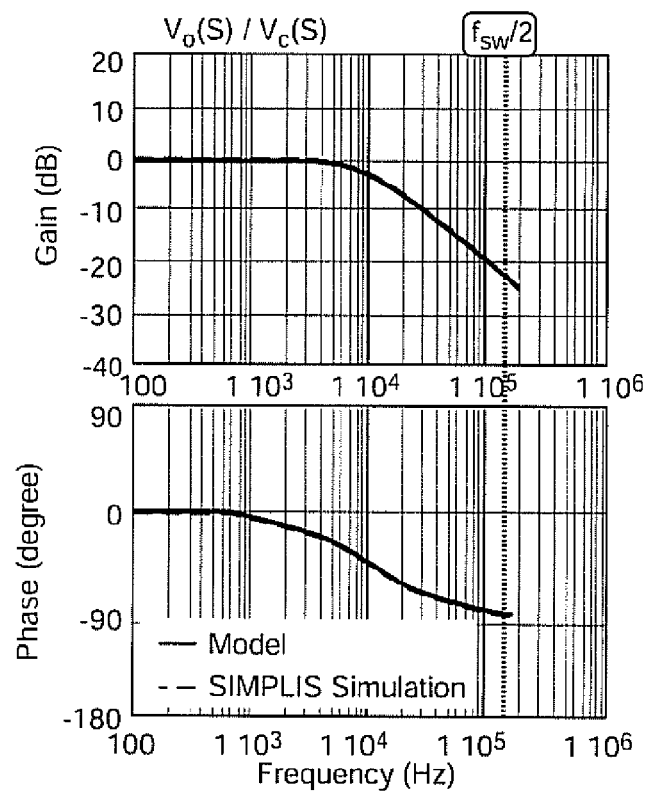
FIGS. 36 and 37 illustrate control-to-$v_o$ transfer functions and output impedances of $V^2$ control with capacitor current ramp compensation.
Figure 37:
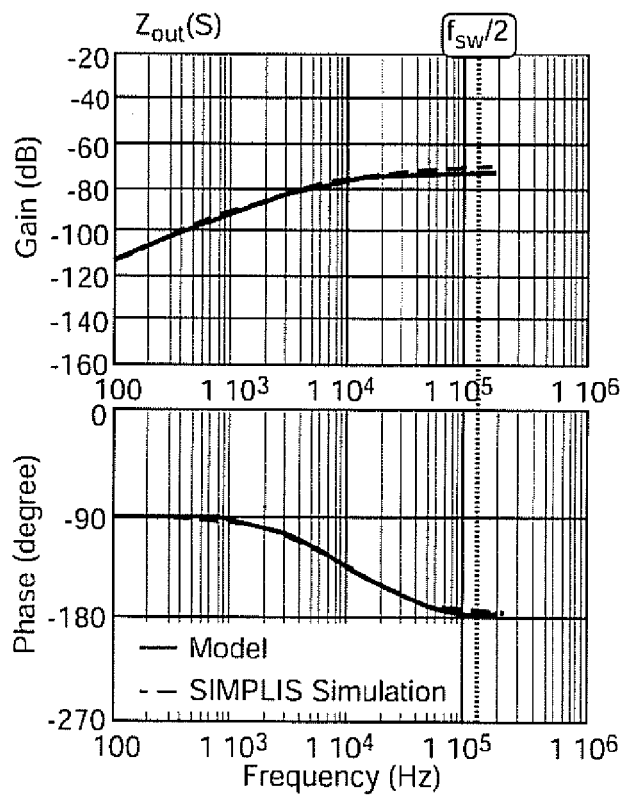

FIG. 36 compares the small signal model, discussed above with the simulation of performance of the power converter in accordance with the invention at a switching frequency, $f_{sw}$ of 300 KHz, $V_{in}$=12 V, $V_o$=1.2 V, $L_s$=600 nH, $C_o$=800 μf, $R_{co}$=0.175Ω, $R_L$=0.1Ω and a current sensing gain of 20 mΩ. FIG. 37 shows the output impedance of the simulated circuit. Thus simulated performance is seen to be in very close agreement with the small signal model as discussed above.

Figure 38:
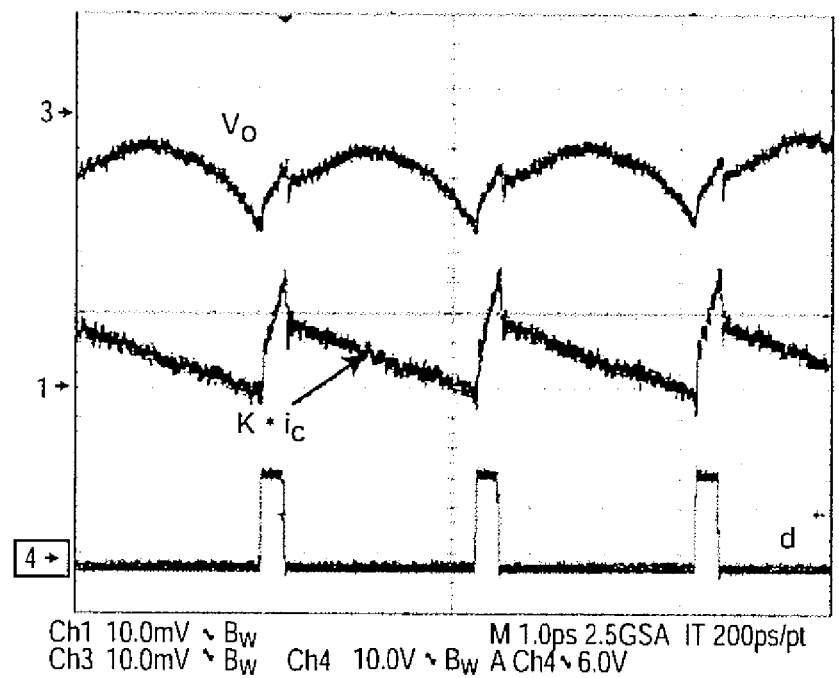
FIGS. 38 and 39 illustrate key waveforms of steady-state and transient response of $V^2$ control in accordance with the invention using capacitor current injection.
Figure 39:
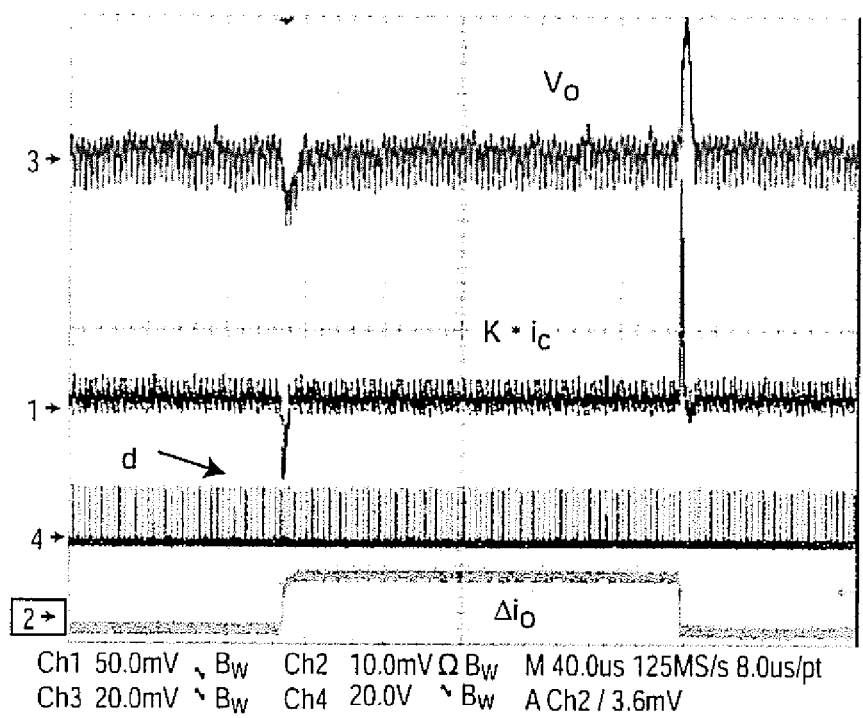

FIGS. 38 and 39 show performance of a prototype buck converter in accordance with the invention with $f_{sw}$, of 300 KHz, $V_{in}$=12 V, $V_o$=1.2 V, $L_s$=0.47 μH, $C_o$=100*5 μf, $R_{co}$=0.4 mΩ, $R_L$=0.3Ω and a current sensing gain, K is 7.8 mΩ. FIG. 38 shows the key waveforms in a steady state including the output voltage ripple, the summed feedback ripple and the duty cycle of switch driver signal, d (see FIG. 7) and the load current transient, $\Delta i_o$. The capacitor current triangle is emulated and the system is stabilized by the capacitor current signal injection into the feedback loop. FIG. 39 shows the actual transient response of the buck converter with the control scheme in accordance with the invention as discussed above. It is clearly seen that capacitor current response to the load step is immediate and that the output voltage response is very fast.

Figure 40:
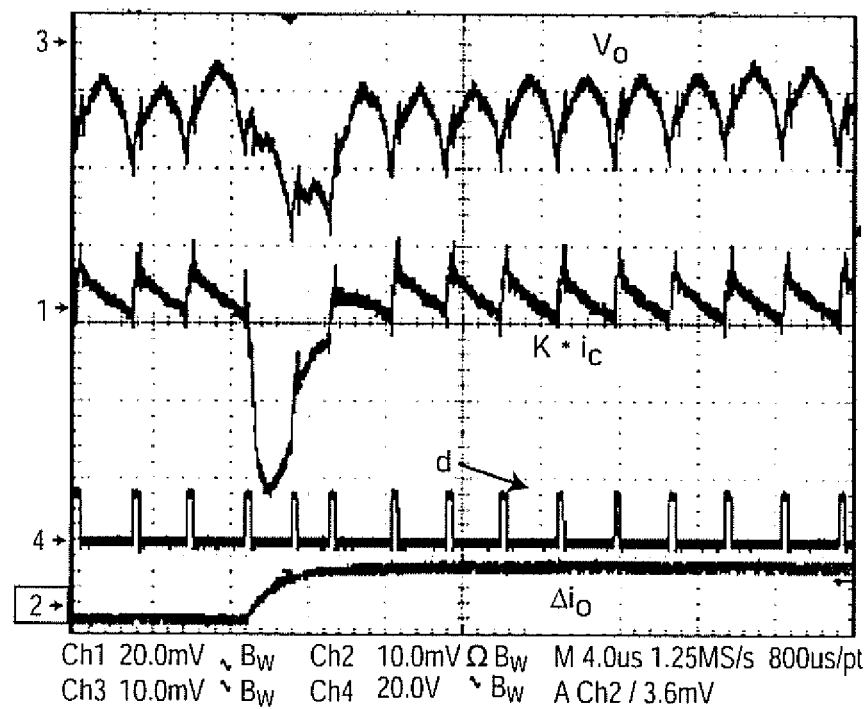
FIGS. 40 and 41 show detailed waveforms during load step-up and step-down transients.
Figure 41:
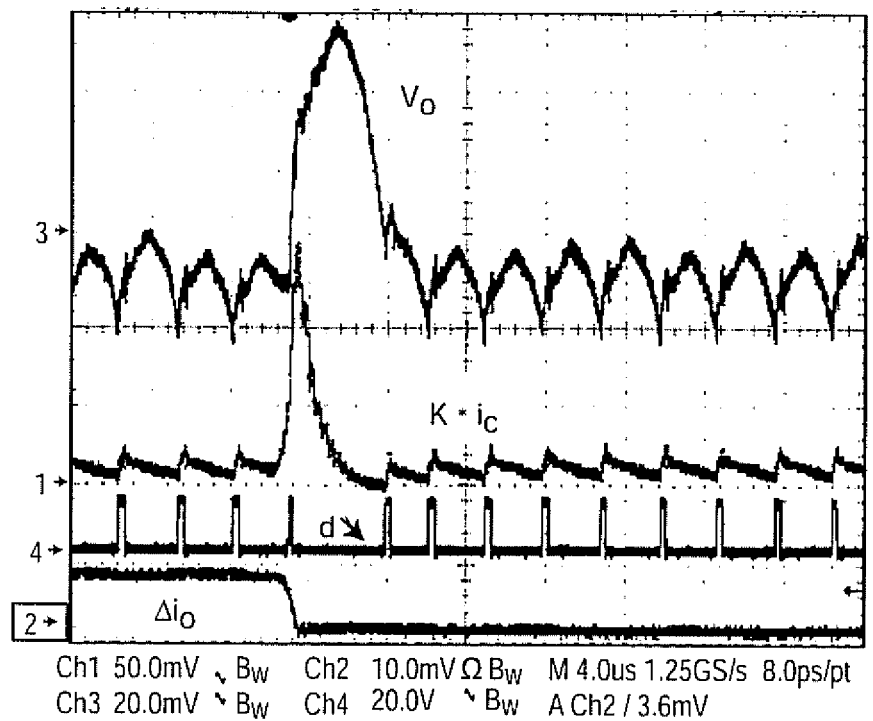
Figure 42:
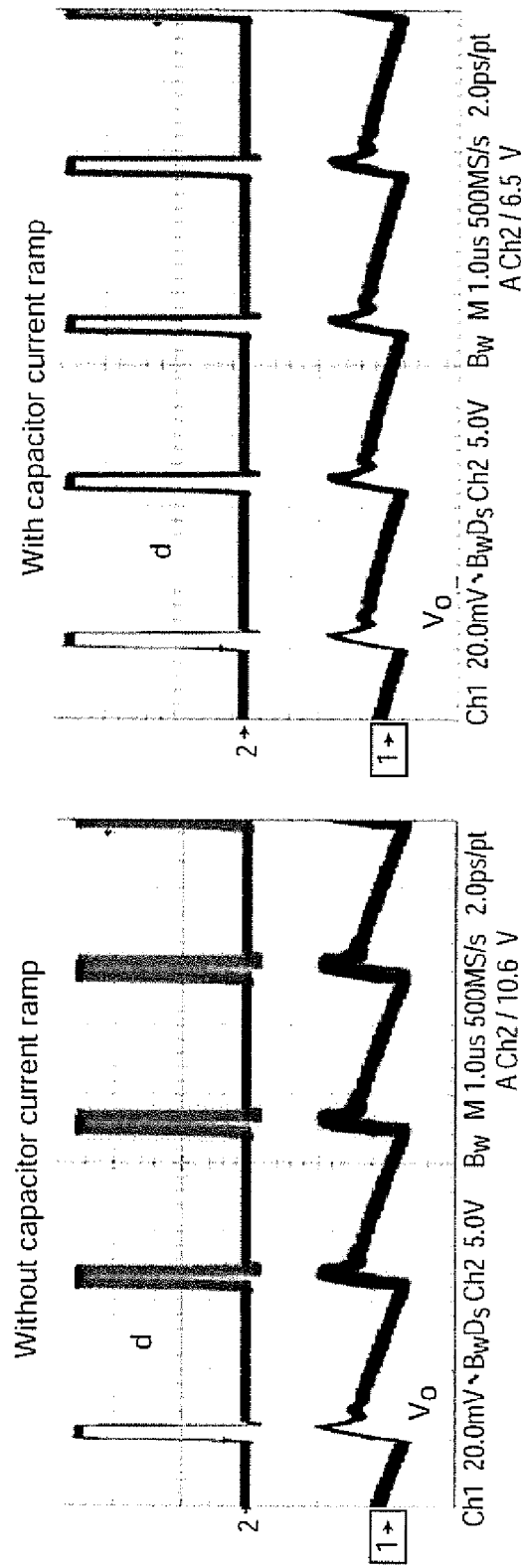
FIG. 42 shows reduction in jittering through use of a capacitor current ramp for compensation.

FIGS. 40 and 41 are expanded views of the load step-up and load step-down responses. It can be seen that the output voltage recovers to the steady-state value in one to two switching cycles The overshoot during load step-down is larger than undershoot because the duty cycle is saturated (D=0). FIG. 42 shows a comparison of the duty cycle and output voltage waveforms with and without capacitor current ramp stabilization. It is clearly seen that the jittering effects are markedly reduced by using the capacitor current ramp for stabilization.

In view of the foregoing, it is clearly seen that use of the capacitor current signal ramp can provide stable operation with much reduced jittering of the output voltage even when ceramic capacitors are used as the output/filter capacitor of a power converter or voltage regulator. The capacitor current ramp is sensed without increase of the effective series resistance of the output/filter capacitor by providing a "lossless" current sensing branch having the same time constant as the output/filter capacitor but allows raising the impedance and thus reducing current and resistive losses to any desired degree including negligible levels. Optimal matching of time constants is automatically provided by calibration in accordance with current level comparison of the directly or indirectly measured inductor current with the capacitor current sensing signal during start-up or as determined to be necessary when the load current is low or zero. The gain of the capacitor current sensing branch allows damping of load transients, and step-down, worst case load transients to be optimally tuned either manually or automatically. Thus, performance can be automatically improved to substantially optimal without use of either inductor current or an external ramp signal to obtain stabilization and reduction of jittering even when ceramic capacitors are used for the output/filter capacitor.

While the invention has been described in terms of a single preferred embodiment, those skilled in the art will recognize that the invention can be practiced with modification within the spirit and scope of the appended claims.

We claim:

1. A power converter comprising
   an output or filter capacitor having an equivalent series resistance similar to that of a ceramic capacitor,
   a control circuit including a direct output voltage feedback path,
   a current sensor for measuring current in said output or filter capacitor to produce a voltage signal proportional to current in said output or filter capacitor, wherein said current sensor includes a branch circuit in parallel with said output or filter capacitor,
   an arrangement for combining said signal proportional to current in said output or filter capacitor with a signal in said direct output voltage feedback path,
   a comparator for automatically calibrating said branch circuit to have a time constant substantially equal to a time constant of said output or filter capacitor, wherein said comparator compares a signal representing current in said branch circuit to a signal representing inductor current to develop a signal for adjusting said time constant of said branch circuit, and
   a transfer function circuit for said signal that is proportional to current in said output or filter capacitor whereby said transfer function circuit automatically adjusts damping of transient response of said power converter to a level that provides an optimal a desired settling time.

2. A power converter as recited in claim 1, wherein said power converter has a buck converter topology.

3. A power converter as recited in claim 1, wherein said inductor current is directly measured.

4. A power converter as recited in claim 3, wherein said inductor current is directly measured with a resistor.

5. A power converter as recited in claim 1, wherein said current sensor has adjustable gain.

6. A power converter as recited in claim 5, further including
   means for automatically tuning said adjustable gain of said current sensor.

7. A power converter as recited in claim 6, wherein said means for automatically tuning said adjustable gain of said current sensor includes a detector which detects oscillation as gain is reduced.

8. A power converter as recited in claim 7, wherein said detector compares output voltage of said power converter with a threshold voltage.

9. A power converter as recited in claim 7, wherein said detector compares an output voltage of said power converter with a control signal.

10. A method of controlling a power converter having a switch driver and an output or filter capacitor having an equivalent series resistance similar to that of a ceramic capacitor, said method comprising steps of
    sensing current in said output or filter capacitor to derive a capacitor current signal, wherein said step of sensing current in said output or filter capacitor includes providing gain to a signal corresponding to current in said output or filter capacitor,
    combining said capacitor current signal with an output voltage signal of said power converter to form a combined signal,
    controlling said switch driver of said power converter with said combined signal,
    tuning said gain to optimize damping following a load and/or reference step transient to obtain a desired settling time or pattern, and
    automatically adjusting gain of a signal representing current in said output or filter capacitor responsive to sensed transient response of said power converter to provide an optimal desired settling time.

11. A method of controlling a power converter having a switch driver and an output or filter capacitor having an equivalent series resistance similar to that of a ceramic capacitor, said method comprising steps of
    sensing current in said output or filter capacitor to derive a capacitor current signal,
    combining said capacitor current signal with an output voltage signal of said power converter to form a combined signal,
    controlling said switch driver of said power converter with said combined signal,
    automatically matching a time constant of a branch circuit connected in parallel with said output or filter capacitor with a time constant of said output or filter capacitor, and
    automatically adjusting gain of a signal representing current in said output or filter capacitor responsive to sensed transient response of said power converter to provide an optimal damping level to achieve a desired settling time of said transient response.

12. The power converter as recited in claim 1 wherein said converter controls a switched array of resistors or capacitors.

13. The power converter as recited in claim 1, wherein said comparator is responsive to output current of said power converter.

14. The method as recited in claim 11, wherein said automatically matching step is performed automatically in response to inductor current in said power converter.

15. The method as recited in claim 11, wherein said matching of said time constant of said branch circuit is performed by control of a switched array of resistors or capacitors.

16. The method as recited in claim 11, wherein said matching of said time constant of said branch circuit is responsive to sensed current input to, output by or within said power converter.

\* \* \* \* \*